(12) United States Patent
Ishihara et al.

(10) Patent No.: US 10,616,394 B2
(45) Date of Patent: Apr. 7, 2020

(54) CORDLESS TELEPHONE, BASE UNIT, AND REPEATER

(71) Applicant: Panasonic Intellectual Property Management Co., Ltd., Osaka (JP)

(72) Inventors: Hiroyuki Ishihara, Fukuoka (JP); Akira Shibuta, Fukuoka (JP); Hirokazu Sugiyama, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/387,360

(22) Filed: Apr. 17, 2019

(65) Prior Publication Data
US 2019/0387090 A1 Dec. 19, 2019

(30) Foreign Application Priority Data
Jun. 13, 2018 (JP) ................................ 2018-112627

(51) Int. Cl.
*H04M 1/725* (2006.01)
*H04M 11/06* (2006.01)
*H04B 7/005* (2006.01)

(52) U.S. Cl.
CPC ............ *H04M 1/725* (2013.01); *H04B 7/005* (2013.01); *H04M 11/06* (2013.01)

(58) Field of Classification Search
CPC ........ H04M 1/725; H04M 11/06; H04B 7/005
USPC ....... 455/550.1, 426.1, 462, 465, 414.1, 418
See application file for complete search history.

(56) References Cited

U.S. PATENT DOCUMENTS

| | | | | |
|---|---|---|---|---|
| 5,889,781 | A * | 3/1999 | Eftimakis | H04J 3/0685 370/301 |
| 2008/0130479 | A1* | 6/2008 | Li | H04L 5/1469 370/203 |
| 2013/0083877 | A1* | 4/2013 | Gorokhov | H04J 11/0073 375/354 |
| 2018/0323925 | A1* | 11/2018 | Huang | H04L 5/0051 |

FOREIGN PATENT DOCUMENTS

JP 2017-017462 A 1/2017

* cited by examiner

*Primary Examiner* — Nghi H Ly
(74) *Attorney, Agent, or Firm* — Seed IP Law Group LLP

(57) ABSTRACT

A cordless telephone that establishes a call with a telephone of a destination via a base unit includes a controller and a radio unit. The controller modulates control data for controlling radio communication and voice data to be transmitted to the telephone, and stores a modulation control signal of the control data and a modulation voice signal of the voice data in a half slot of a Digital Enhanced Cordless Telecommunications (DECT) system. The radio unit transmits, by radio, the half slot to the base unit.

18 Claims, 14 Drawing Sheets

IN CASE OF NARROW BAND VOICE, 12 SETS
IN CASE OF WIDE BAND VOICE, 6 SETS

IN BOTH CASES OF NARROW BAND VOICE
AND WIDE BAND VOICE, 24 SETS

CORDLESS TELEPHONE, BASE UNIT, AND REPEATER

CROSS REFERENCE TO RELATED APPLICATIONS

This application is entitled to and claims the benefit of Japanese Patent Application No. 2018-112627, filed on Jun. 13, 2018, the disclosure of which including the specification, drawings and abstract is incorporated herein by reference in its entirety.

TECHNICAL FIELD

The present disclosure relates to a cordless telephone, a base unit, and a repeater.

BACKGROUND ART

As a communication method for a digital cordless telephone, Digital Enhanced Cordless Telecommunications (DFCT) system has been known. Patent Literature 1 discloses a cordless telephone using the DECT system. A cordless telephone of Patent Literature 1 is configured to prevent quality degradation of a call by switching the channel automatically before the quality degradation of a call is recognized by a user.

CITATION LIST

Patent Literature

PTL 1
Japanese Patent Application Laid-Open No. 2017-017462

SUMMARY OF INVENTION

Technical Problem

The number of communication channels in each of downlink and uplink in the DECT system is twelve channels for narrow band voice calls, and six channels for wide band voice calls. The market desires a larger number of communication channels.

Non-limiting embodiments of the present disclosure contribute to providing a cordless telephone, a base unit, and a repeater that enable an increase in the number of communication channels.

Solution to Problem

A cordless telephone according to one aspect of the present disclosure is a cordless telephone that establishes a call with a telephone of a destination via a base unit, the cordless telephone including: a controller that modulates control data for controlling radio communication and voice data to be transmitted to the telephone, and stores a modulation control signal of the control data and a modulation voice signal of the voice data in a half slot of a Digital Enhanced Cordless Telecommunications (DECT) system; and a radio unit that transmits, by radio, the half slot to the base unit.

A base unit according to one aspect of the present disclosure is a base unit that performs radio communication with a cordless telephone, the base unit including: a controller that modulates control data for controlling the radio communication and voice data to be transmitted to the cordless telephone, and stores a modulation control signal of the control data and a modulation voice signal of the voice data in a half slot of a DECT system; and a radio unit that transmits, by radio, the half slot to the cordless telephone.

A repeater according to one aspect of the present disclosure is a repeater that relays radio communication between a cordless telephone and a base unit with use of a half slot of a DECT system, the repeater including: a controller that duplicates control data and voice data stored in a half slot of uplink received from the cordless telephone to another half slot of the uplink, and duplicates control data and voice data stored in a half slot of downlink received from the base unit to another half slot of the downlink; and a radio unit that transmits, by radio, the other half slot of the uplink to the base unit, and transmits, by radio, the other half slot of the downlink to the cordless telephone.

It should be noted that these comprehensive or specific aspects may be realized by a system, a method, an integrated circuit, a computer program, or a recording medium, or may be realized by any combination of a system, an apparatus, a method, an integrated circuit, a computer program, and a recording medium.

Advantageous Effects of Invention

According to one aspect of the present disclosure, the number of communication channels can be increased.

Further advantages and effects according to one aspect of the present disclosure will be made apparent from the description and the drawings. These advantages and/or effects are provided by features disclosed in some embodiments, the description, and the drawings. However, all of them do not necessarily need to be provided to obtain one or more same features.

DESCRIPTION OF EMBODIMENTS

Embodiments of the present invention will be described in detail below with reference to the accompanying drawings as appropriate. However, unnecessarily detailed description may be omitted. For example, detailed description of well-known matters and duplicate description of substantially the same configuration may be omitted. This is to prevent the following description from being unnecessarily redundant so as to facilitate understanding of those skilled in the art.

It shod be noted that the accompanying drawings and the description below are provided for those skilled in the art to fully understand the present disclosure, and do not intend to limit the subject matter of the claims.

Embodiment 1

Figure 1:
FIG. 1 illustrates an exemplary configuration of a cordless telephone system according to Embodiment 1 of the present disclosure.

FIG. 1 illustrates an exemplary configuration of a cordless telephone system according to Embodiment 1 of the present disclosure. As illustrated in FIG. 1, the cordless telephone system includes cordless telephone 1 and base unit 2. A cordless telephone system is installed in an office or a home, for example.

Cordless telephone 1 and base unit 2 perform radio communication of Time Division Multiple Access (TDMA) system conforming to the DECT system. Cordless telephone 1 and base unit 2 perform radio communication with use of a radio wave of 1.9 GHz band or a radio wave of 1.8 GHz band, for example.

Base unit 2 is connected with a switch or a server (not illustrated) via the Ethernet (registered trademark) or Public Switched Telephone Network (PSTN). Cordless telephone 1 is able to establish a call with another telephone via base unit 2.

Although FIG. 1 illustrates only one cordless telephone 1, there may be a plurality of cordless telephones. A plurality of cordless telephones 1 are able to establish simultaneous calls. For example, in the cordless telephone system illustrated in FIG. 1, it is possible to establish simultaneous calls by twenty four cordless telephones at maximum in either the case of narrow band voice calls or the case of wide band voice calls. This will be described in detail below. In other words, the number of communication channels of the cordless telephone system illustrated in FIG. 1 is twenty four channels in either the case of narrow band voice calls or the case of wide band voice calls.

Cordless telephone 1 may be referred to as a handset, for example. Base unit 2 may be referred to as a base station, for example. A wide band voice call may be referred to as a wide band call. A narrow band voice call may be referred to as a narrow band call.

Figure 2A:
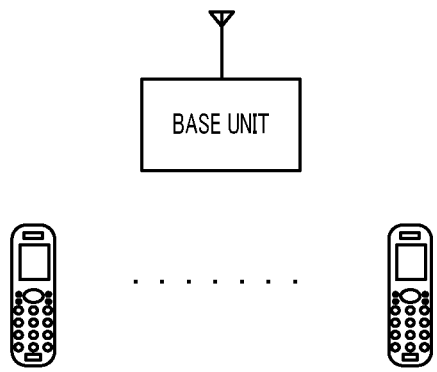
FIG. 2A is an illustration for explaining the maximum number of simultaneous calls in a cordless telephone system of the current DECT system.
Figure 2B:
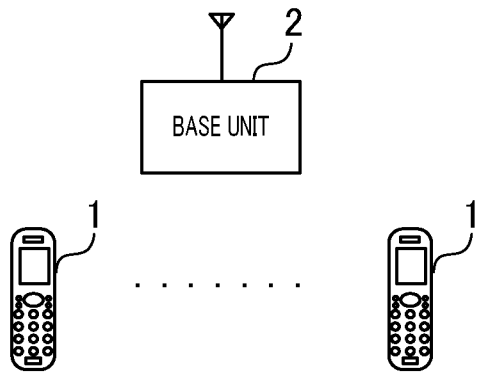
FIG. 2B is an illustration for explaining the maximum number of simultaneous calls in a cordless telephone system of the present disclosure.

FIG. 2A is an illustration for explaining the maximum number of simultaneous calls in a cordless telephone system of the current DECT system. FIG. 2B is an illustration for explaining the maximum number of simultaneous calls in the cordless telephone system of the present disclosure.

As illustrated in FIG. 2A, in the current DECT system, the maximum number of simultaneous calls by cordless telephones with respect to one base unit is twelve in the case of narrow band voice calls. In the case of wide band voice calls, the number of calls is six.

In contrast, in the cordless telephone system of FIG. 1, the maximum number of simultaneous calls with respect to one base unit is twenty four in either the case of narrow band voice calls and the case of wide band voice calls, as illustrated in FIG. 2B. The cordless telephone system of FIG. 1 increases the maximum number of simultaneous calls in the narrow band voice calls and the maximum number of simultaneous calls in the wide band voice calls, while suppressing degradation of the voice quality.

Figure 3:
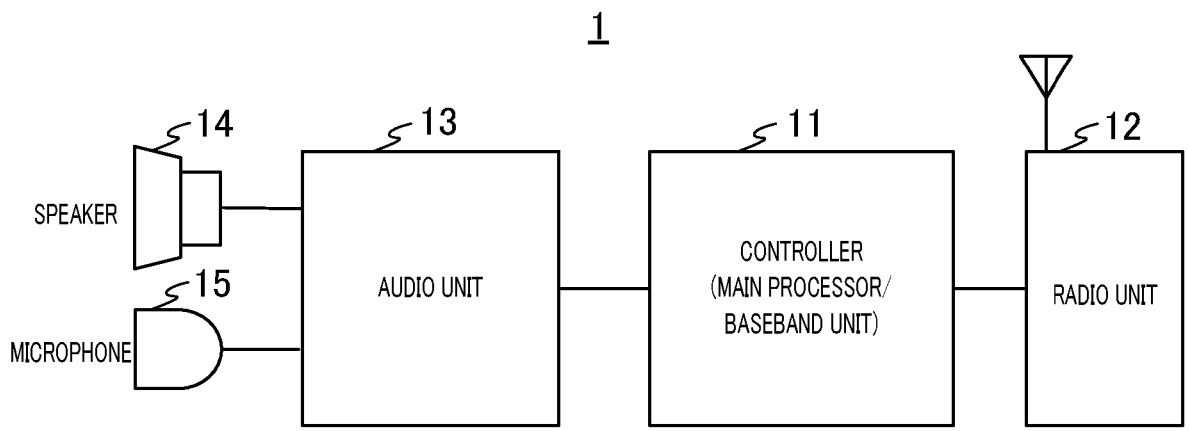
FIG. 3 illustrates an exemplary block configuration of a cordless telephone.

FIG. 3 illustrates an exemplary block configuration of cordless telephone 1. As illustrated in FIG. 3, cordless telephone 1 includes controller 11, radio unit 12, audio unit 13, speaker 14, and microphone 15.

Controller 11 controls the entire cordless telephone 1. Controller 11 also performs baseband processing. Controller 11 may be configured of either one of or both of Central Processing Unit (CPU) and Digital Signal Processor (DSP), for example. Controller 11 may also be referred to as a main processor/baseband unit.

To radio unit 12, an uplink (UL) signal (signal to be transmitted to base unit 2) output from controller 11 is input. Radio unit 12 performs transmission processing such as amplification and up-conversion, on an input UL signal. Radio unit 12 transmits a UL signal, on which transmission processing is performed, to base unit 2 via an antenna.

Radio unit 12 receives a downlink (DL) signal (signal transmitted from base unit 2) via an antenna. Radio unit 12 performs reception processing such as amplification and down-conversion, on the received DL signal. Radio unit 12 outputs the DL signal, on which reception processing is performed, to controller 11.

Audio unit 13 converts digital voice data (DL signal) output from controller 11 into an analog voice signal, and outputs it to speaker 14. Audio unit 13 also converts an analog voice signal (UL signal) output from microphone 15, and outputs it to controller 11.

Figure 4:
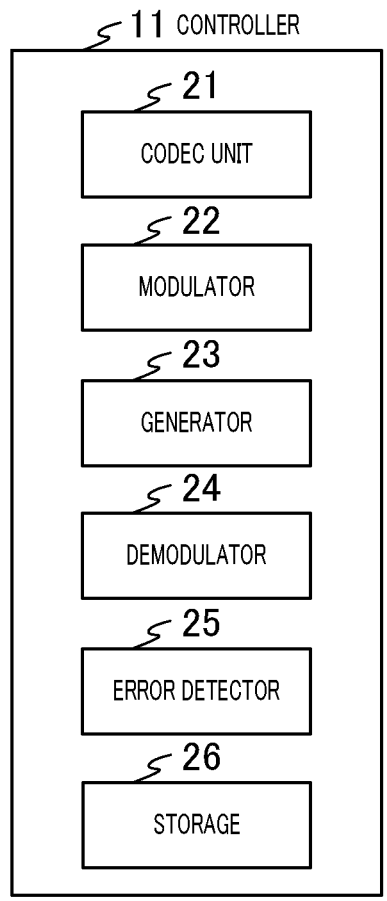
FIG. 4 illustrates an exemplary block configuration of a controller of a cordless telephone.

FIG. 4 illustrates an exemplary block configuration of controller 11 of cordless telephone 1. As illustrated in FIG. 4, controller 11 of cordless telephone 1 includes codec unit 21, modulator 22, generator 23, demodulator 24, error detector 25, and storage 26.

Codec unit 21 encodes (compresses) voice data (UL signal) to be transmitted to base unit 2. For example, codec unit 21 encodes voice data to be transmitted to base unit 2 by means of Constrained Energy Lapped Transform (CELT). Codec unit 21 outputs the encoded voice data to modulator 22.

Further, codec unit 21 decodes (extends) the voice data (DL signal) demodulated by demodulator 24. For example, codec unit 21 decodes the voice data demodulated by demodulator 24, by means of CELT. Codec unit 21 outputs the decoded voice data to audio unit 13.

Modulator 22 applies multi-level modulation to voice data encoded by codec unit 21. Modulator 22 also applies multi-level modulation to other types of data (for example, control data, CRC data, and the like). For example, modulator 22 applies QPSK modulation to the voice data encoded by codec unit 21. Modulator 22 also applies Quadrature Phase Shift Keying (QPSK) modulation to other types of data.

Generator 23 generates a half slot (to be described below) containing data modulated by modulator 22. Generator 23 outputs the generated half slot to radio unit 12.

Demodulator 24 demodulates a signal (DL signal), transmitted from base unit 2, to be output from radio unit 12. For example, demodulator 24 applies QPSK demodulation to a signal to be output from radio unit 12. Voice data contained in the demodulated signal (data) is output to codec unit 21, and is decoded.

Error detector 25 detects an error in the data demodulated by demodulator 24. For example, error detector 25 detects an error in the data demodulated by demodulator 24, by means of Cyclic Redundancy Check (CRC).

In storage 26, a program for operation of controller 11 is stored, for example. In storage 26, data for calculation processing or data for controlling respective units of cordless telephone 1, to be performed by controller 11, are also stored. Storage 26 may reside outside controller 11.

Figure 5:
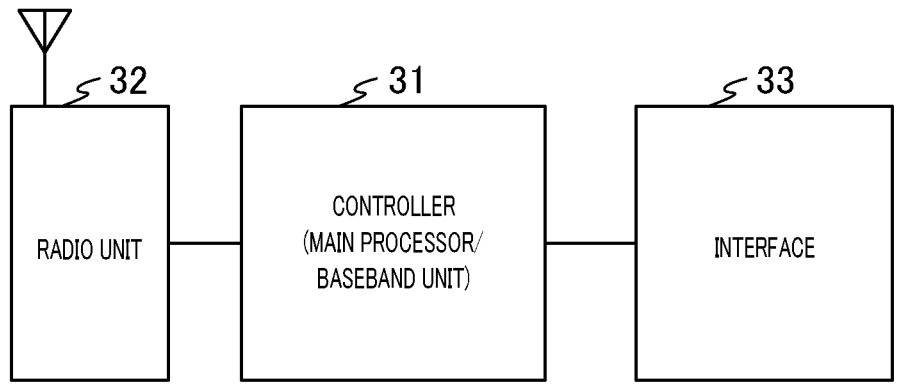
FIG. 5 illustrates an exemplary block configuration of a base unit.

FIG. 5 illustrates an exemplary block configuration of base unit 2. As illustrated in FIG. 5, base unit 2 includes controller 31, radio unit 32, and interface 33.

Controller 31 controls the entire base unit 2. Controller 31 also performs baseband processing. Controller 31 may be configured of either one of or both of a CPU and a DSP, for example. Controller 31 may also be referred to as a main processor/baseband unit.

Radio unit 32 receives a UL signal (signal transmitted from cordless telephone 1) via an antenna. Radio unit 32 performs processing such as amplification and down-conversion, on the received UL signal. Radio unit 32 outputs the UL signal subjected to processing such as amplification and down-conversion, to controller 31.

To radio unit 32, a DL signal (signal to be transmitted to cordless telephone 1) output from controller 31 is input. Radio unit 32 performs processing such as amplification and up-conversion, on the input DL signal. Radio unit 32 transmits the DL signal subjected to processing such as amplification and up-conversion to cordless telephone 1 via an antenna.

Interface 33 controls communication with a switch or a server. For example, interface 33 transmits data to be output from controller 31 (signal transmitted from cordless telephone 1) to a switch or a server. Interface 33 also receives data transmitted from a switch or a server (signal to be transmitted to cordless telephone 1), and outputs it to controller 31.

Figure 6:
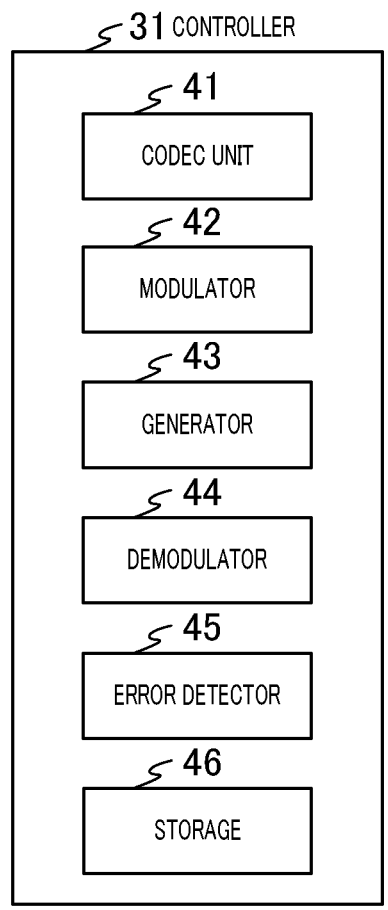
FIG. 6 illustrates an exemplary block configuration of a controller of a base unit.

FIG. 6 illustrates an exemplary block configuration of controller 31 of base unit 2. As illustrated in FIG. 6, controller 31 of base unit 2 includes codec unit 41, modulator 42, generator 43, demodulator 44, error detector 45, and storage 46.

Codec unit 41 encodes (compresses) voice data (DL signal) to be output from interface 33. For example, codec unit 41 encodes voice data to be output from interface 33, by means of CELT of voice codec.

Codec unit 41 also decodes (extends) voice data (UL signal) demodulated by demodulator 44. For example, codec unit 41 decodes voice data demodulated by demodulator 44, by means of CELT. Codec unit 41 outputs the decoded voice data to interface 33.

Modulator 42 applies multi-level modulation to voice data encoded by codec unit 41. Modulator 42 also applies multi-level modulation to other types of data (for example, control data, CRC data, and the like). For example, modulator 42 applies QPSK modulation to voice data encoded by codec unit 41. Modulator 42 also applies QPSK modulation to other types of data.

Generator 43 generates a half slot containing data modulated by modulator 42. Generator 43 outputs the generated half slot to radio unit 32.

Demodulator 44 demodulates a signal (DL signal), transmitted from cordless telephone 1, to be output from radio unit 32. For example, demodulator 44 applies QPSK demodulation to a signal to be output from radio unit 32. Voice data contained in the demodulated signal (data) is output to codec unit 41, and is decoded.

Error detector 45 detects an error in the data demodulated by demodulator 44. For example, error detector 45 detects an error in the data demodulated by demodulator 44, by means of CRC.

In storage 46, a program for operation of controller 31 is stored, for example. In storage 46, data for calculation processing or data for controlling respective units of cordless telephone 1, to be performed by controller 31, are also stored. Storage 46 may reside outside controller 31.

Figure 7:
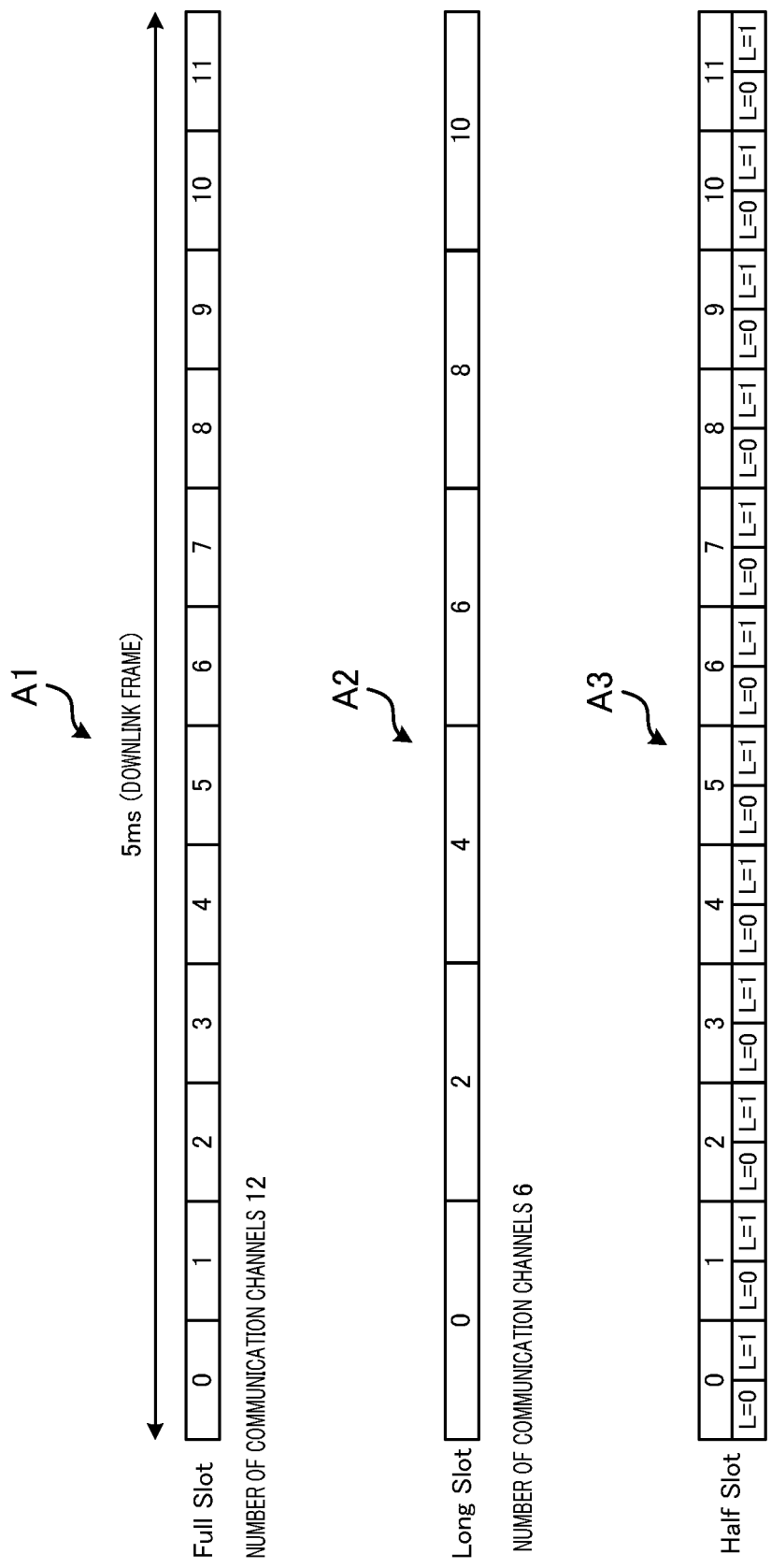
FIG. 7 illustrates a frame configuration of the DECT system.

FIG. 7 illustrates a frame configuration of the DECT system. In the DECT system, radio communication is performed in a frame of 10 ms. A frame of 10 ms is divided into a downlink frame of 5 ms and an uplink frame of 5 ms. FIG. 7 illustrates an example of a downlink frame.

The DECT system defines three types of frames namely a full slot frame, a long slot frame, and a half slot frame. A full slot frame is configured of twelve slots as indicated by arrow A1 in FIG. 7. A long slot frame is configured of six slots as indicated by arrow A2.

A half slot frame is configured of twelve slots as indicated by arrow A3, and one slot is further divided into two slots, that is, L=0 and L=1. Accordingly, a half slot frame is configured of twenty four slots.

As described above, a full slot frame is configured of twelve slots. Therefore, the number of communication channels of a full slot is twelve, and the number of maximum simultaneous calls is twelve. A long slot frame is configured of six slots. Therefore, the number of communication channels of a long slot is six, and the number of maximum simultaneous calls is six.

A half slot frame is configured of twenty four slots. Therefore, the number of communication channels of a half slot is twenty four, and the number of maximum simultaneous calls is twenty four. As will be discussed below, deterioration of voice quality is severe in a half slot frame. Therefore, it is not used at present.

While a downlink frame is illustrated in FIG. 7, an uplink frame also has a similar configuration.

Figure 8:
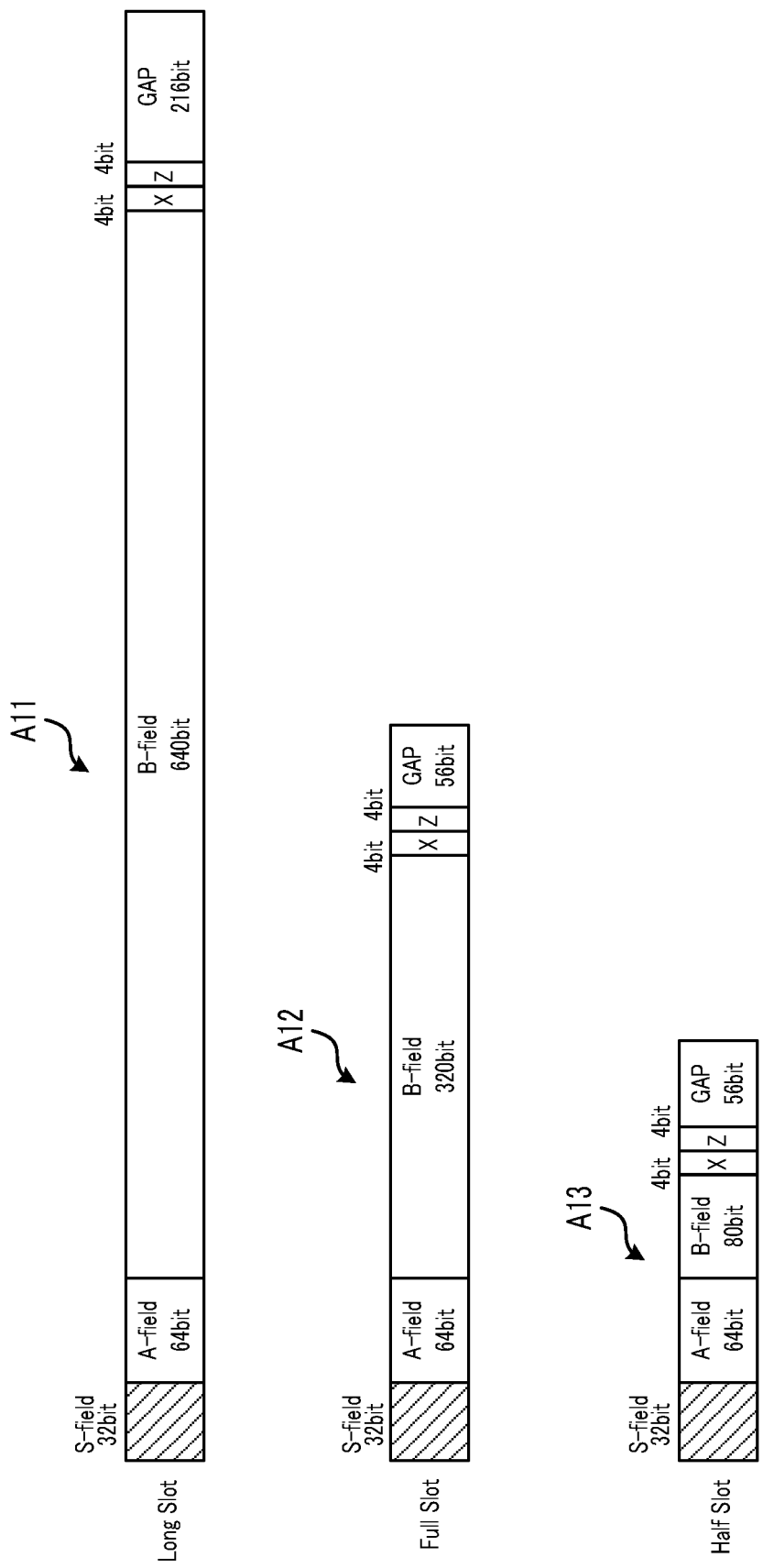
FIG. 8 illustrates a slot configuration of the DECT system.

FIG. 8 illustrates a slot configuration of the DECT system. As indicated by arrow A12 in FIG. 8, a full slot includes an S-Field, an A-Field, a B-Field, an X-Field, a Z-Field, and GAP.

In the S-Field, information for synchronization of a slot and a frame are stored. In the A-Field, control data for controlling radio communication is stored. Control data includes messages such as a call request and call start, for example. In the B-Field, voice data is stored. In the X-Field and the Z-Field, information for performing error detection such as Cyclic Redundancy Check (CRC) is stored. GAP is a section that is provided for switching the radio frequency (radio channel) by the radio unit.

As indicated by arrow A13 in FIG. 8, a half slot also includes an S-Field, an A-Field, a B-Field, an X-Field, a Z-Field, and GAP, similar to the full slot. In the half slot, the length of the B-Field is shorter than the B-Field of the full slot. The total length of the half slot is a half of the total length of the full slot (see also half slot indicated by arrow A3 in FIG. 7).

As indicated by arrow A11 in FIG. 8, a long slot also includes an S-Field, an A-Field, a B-Field, an X-Field, a Z-Field, and GAP, similar to the full slot. In the long slot, the length of the B-Field is longer than that of the B-Field of the full slot. The total length of the long slot is twice the total length of the full slot (see also long slot indicated by arrow A2 in FIG. 7).

In the DECT system, it is defined that voice codec of 32 kbps (G.726) may also be used. As indicated by arrow A12 in FIG. 8, in the B-field of the full slot, 320-bit voice data is stored. Thereby, in the full slot, it is possible to establish a call with voice data of 32 kbps.

In the DECT system, it is also defined that voice codec of 64 kbps (G.722) may be used. As indicated by arrow A11 in FIG. 8, in the B-field of the long slot, 640-bit voice data is stored. Thereby, in the long slot, it is possible to establish a call with voice data of 64 kbps.

As indicated by arrow A13 in FIG. 8, in the B-field of the half slot, 80-bit voice data is stored. Thereby, in the half slot, it is possible to establish a call with voice data of 8 kbps.

However, when voice data is compressed to 8 kbps, degradation of voice quality becomes severe. Therefore, in the DECT system, a half slot is not used at present although the number of communication channels is as large as twenty four.

Meanwhile, the market desires a larger number of communication channels. For example, currently, the number of communication channels for narrow band voice calls using a full slot (32 kbps) is twelve, as described above. Further, the number of communication channels for wide band voice calls using a long slot (64 kbps) is six, as described above. The market desires communication channels exceeding these numbers.

In view of the above, the cordless telephone system of the present disclosure increases the number of communication channels for narrow band voice calls and wide band voice calls to twenty four, while suppressing degradation of the voice quality.

Figure 9:
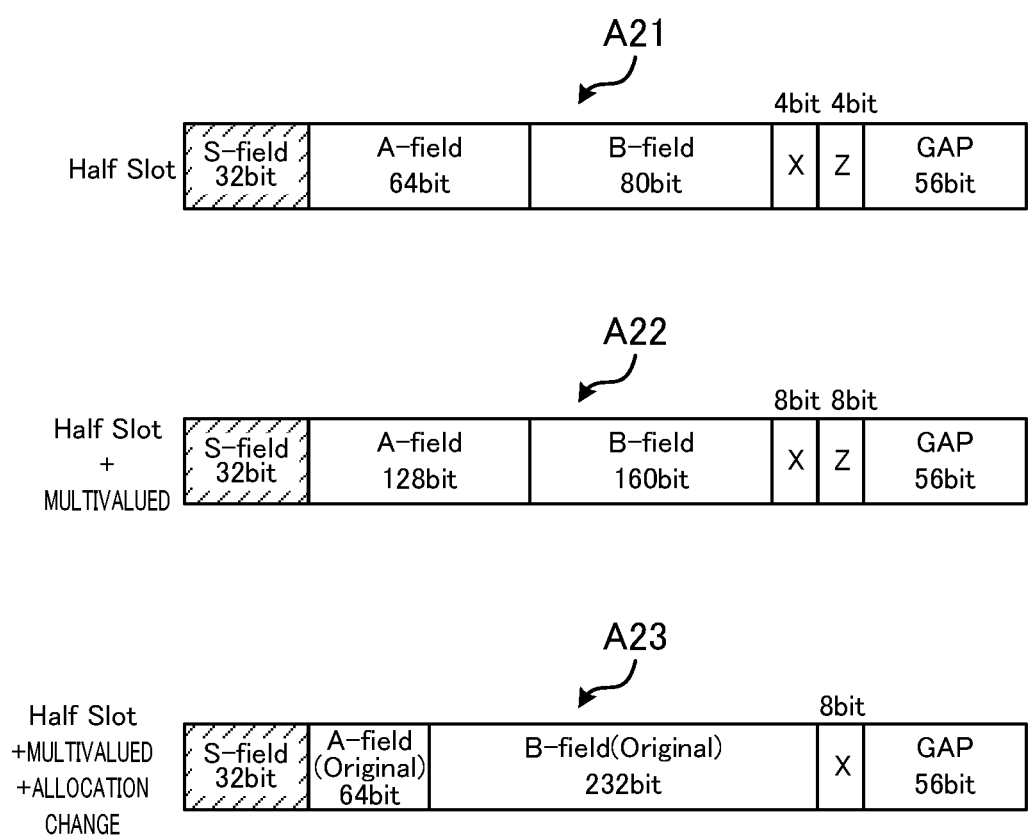
FIG. 9 illustrates a slot configuration of a cordless telephone system of the present disclosure conforming to the DECT system.

FIG. 9 illustrates a slot configuration of the cordless telephone system of the present disclosure conforming to the DECT system. In the cordless telephone system of the present disclosure, half slot frames are used in order to increase the number of communication channels. At that time, in order to suppress degradation of voice quality, multi-level modulation by QPSK modulation is performed on the voice data. Also, the structure of allocating voice data in the half slot is changed. By performing multi-level modulation by QPSK modulation, it is possible to increase the number of bits of the communication data. That is, it is possible to increase the bit rate of voice data, and to suppress deterioration of voice quality. It should be noted that when the bit rate decreases, compression ratio of voice data increases, quantization error due to encoding increases, and the voice quality is degraded.

The half slot indicated by arrow A21 in FIG. 9 shows a half slot of the current DECT system. As described regarding arrow A13 in FIG. 8, in the B-field of a half slot of the current DFCT system, 80-bit voice data is stored. In the current DECT system, 2 Frequency shift keying (FSK) modulation is applied to voice data, and the voice data subjected to 2FSK modulation is stored in B-field.

Arrow A22 of FIG. 9 indicates a half slot of the case of applying QPSK modulation to the voice data. By applying QPSK modulation to the voice data, 160 bit-voice data is stored in the B-field of the half slot, which is twice as much as the B-filed of the current DECT system. That is, by applying QPSK modulation to the voice data, the voice data transmitted in the B-field is changed from 80 bits to 160 bits as indicated by arrow A22 of FIG. 9.

Similarly, by applying QPSK modulation to control data, the control data transmitted in the A-field is changed from 64 bits to 128 bits as indicated by arrow A22 in FIG. 9. Further, by applying QPSK modulation to error detection information, the error detection information transmitted in the X-field and the Z-field is changed from 4 bits to 8 bits as indicated by arrow A22 in FIG. 9.

Arrow A23 in FIG. 9 indicates an exemplary configuration of a half slot of the cordless telephone system of the present disclosure. In the cordless telephone system of the present disclosure, as indicated by arrow A23, a first half region of the A-field (64 bit) is used as an A-field (Original) that is to be used as a region for transmitting control data. Further, in the cordless telephone system of the present disclosure, as indicated by arrow A23, a second half region of the A-field (64 bit) and the B-field (160 bits) are used as a B-field (Original) that is to be used as a region for transmitting voice data.

In other words, in the cordless telephone system of the present disclosure, a modulated signal of voice data that is multivalued is stored in the B-Field of the half slot and is also stored in a part of the A-Field of the half slot. Further, in the cordless telephone system of the present disclosure, as indicated by arrow A23, an optional Z area is also used as the B-field.

That is, in the cordless telephone system of the present disclosure, voice data, control data, and error detection information are applied with QPSK modulation. Then, as indicated by arrow A23 in FIG. 9, the configuration of the half slot is changed. Thereby, the B-field (Original) storing the voice data becomes 232 bit (64 bits of the second half of A-field)+(160 bit of B-field)+(8 bits of Z)=232 bits), and the number of communication channels is twenty four, and voice communication of 23.2 kbps can be made.

Note that the half slot of the cordless telephone system of the present disclosure has a 64-bit A-field (Original) as a region for transmitting control data, as indicated by arrow A23 in FIG. 9. Therefore, the cordless telephone system of the present disclosure can comply with the DECT system.

As modulation of voice data, it is conceivable to use high multi-level modulation such as 16 quadrature amplitude modulation (QAM). With high multi-level modulation, the amount of communicable voice data is increased. However, the receiving sensitivity of a radio signal is deteriorated and the radio communication distance is shortened. Therefore, it is desirable to use QPSK modulation for modulation of voice data. Of course, multi-level modulation that is larger than QPSK modulation may be used, depending on the radio conditions or the like. For example, 8 Phase Shift Keying (8PSK) may be used.

Further, in the cordless telephone system of the present disclosure, CELT corresponding to variable bit rate is used as codec of voice data. In the cordless telephone system of the present disclosure, as modulation of voice data, QPSK modulation is applied whereby deterioration of the receiving sensitivity of a radio signal is suppressed, and voice data compression by CELT can be limited to compression of up to 23.2 kbps. This can suppress degradation of voice quality. Furthermore, in the case of handling voice data of a voice band in which voice deterioration is allowable even in the compression of 16 kbps, communication may be performed using the B-field (160 bits).

Figure 10:
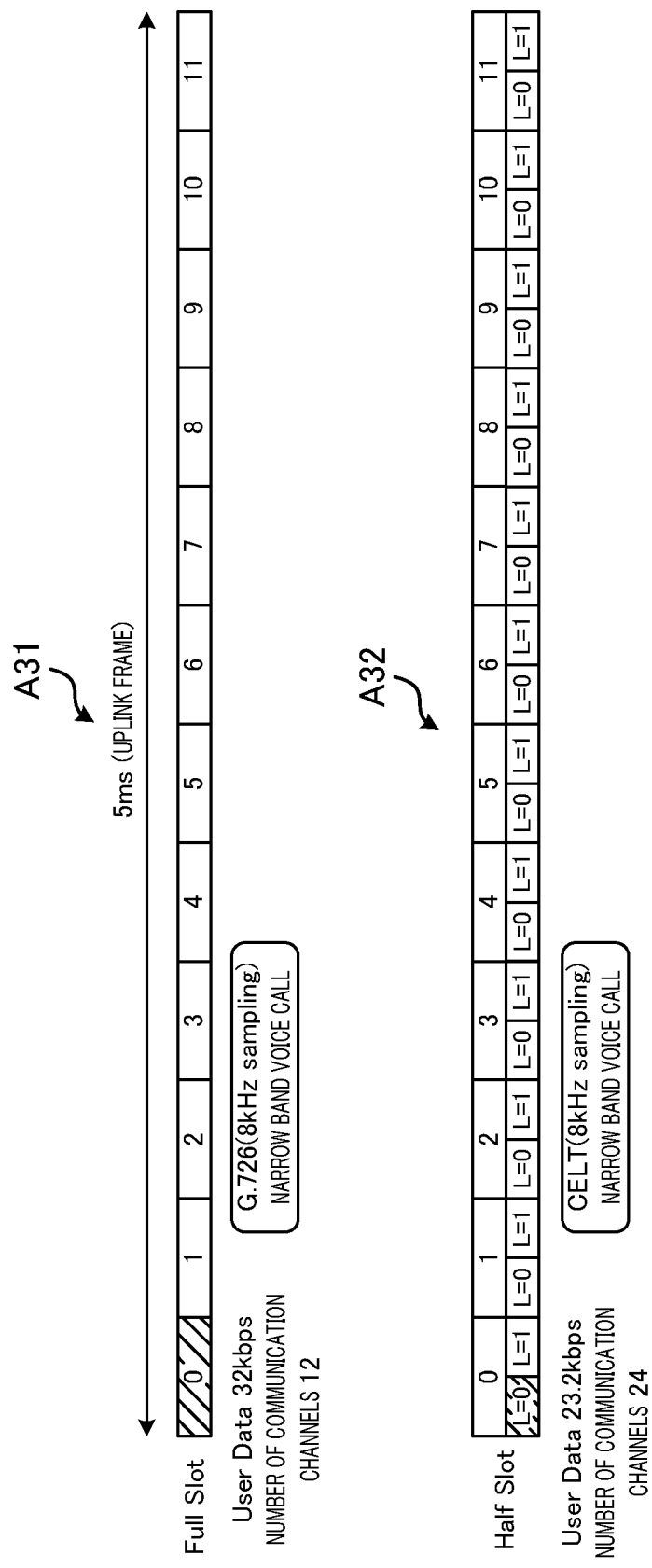
FIG. 10 illustrates an increase in the number of communication channels in a narrow band voice call.

FIG. 10 illustrates an increase in the number of communication channels in narrow band voice calls. Arrow A31 in FIG. 10 indicates an uplink frame configuration of a narrow band voice call by the current DECT system. Arrow A32 in FIG. 10 indicates an uplink frame configuration of a narrow band voice call of the present disclosure that conforms to the DECT system.

Voice data of a narrow band voice call by the current DECT system (8 kHz sampling) is transmitted to the base unit in a full slot, as indicated by arrow A31 in FIG. 10. In the current DECT system, voice data of a narrow band voice call is transmitted to the base unit in a full slot. Therefore, the number of communication channels is twelve.

In contrast, cordless telephone 1 of the present disclosure encodes (compresses) voice data of 8 kHz sampling, collected by microphone 15, by means of CELT. Then, in cordless telephone 1, voice data encoded by CELT is applied with QPSK modulation, and is stored in a half slot as indicated by arrow A32 in FIG. 10. In cordless telephone 1, when 8 kHz sampled voice data is encoded by CELT, it is encoded such that the voice data to be stored in the B-field (Original) of the half slot becomes 23.2 kbps. Cordless telephone 1 transmits voice data of a narrow band voice call to base unit 2 in a half slot. Therefore, the number of communication channels is twenty four.

In the above description, description has been given on uplink. The same also applies to downlink. For example, base unit 2 encodes (compresses) 8 kHz sampled voice data, to be output from interface 33, by means of CELT. Then, base unit 2 applies QPSK modulation to the voice data encoded by CELT, and stores it in a half slot. When encoding the 8 kHz sampled voice data by means of CELT, base unit 2 encodes it such that the voice data to be stored in the B-field (Original) becomes 23.2 kbps. As base unit 2 transmits voice data of a narrow band voice call to cordless telephone 1 in a half slot, the number of communication channels is twenty four.

Note that codec unit 21 of cordless telephone 1 encodes 8 kHz sampled voice data, collected by microphone 15, by means of CELT. Modulator 22 applies QPSK modulation to control data, and to voice data encoded by CELT. Generator 23 stores a modulation signal of the control data applied with QPSK modulation in the 64-bit A-field (Original) of a half slot, and stores a modulation signal of the voice data applied with QPSK modulation in the 232-bit B-field (Original) of the half slot, to thereby generate a half slot. Radio unit 12 puts the generated half slot on the uplink frame, and transmits it to base unit 2 by radio.

Further, codec unit 41 of base unit 2 encodes 8 kHz sampled voice data, to be output from interface 33, by means of CELT. Modulator 42 applies QPSK modulation to control data and voice data encoded by CELT. Generator 43 stores a modulation signal of the control data applied with QPSK modulation the 64-bit A-field (Original) of a half slot, and stores a modulation signal of the voice data applied with QPSK modulation in the 232-bit B-field (Original) of the half slot, to thereby generate a half slot. Radio unit 32 outs the generated half slot on the downlink frame, and transmits it to cordless telephone 1 by radio.

Figure 11:
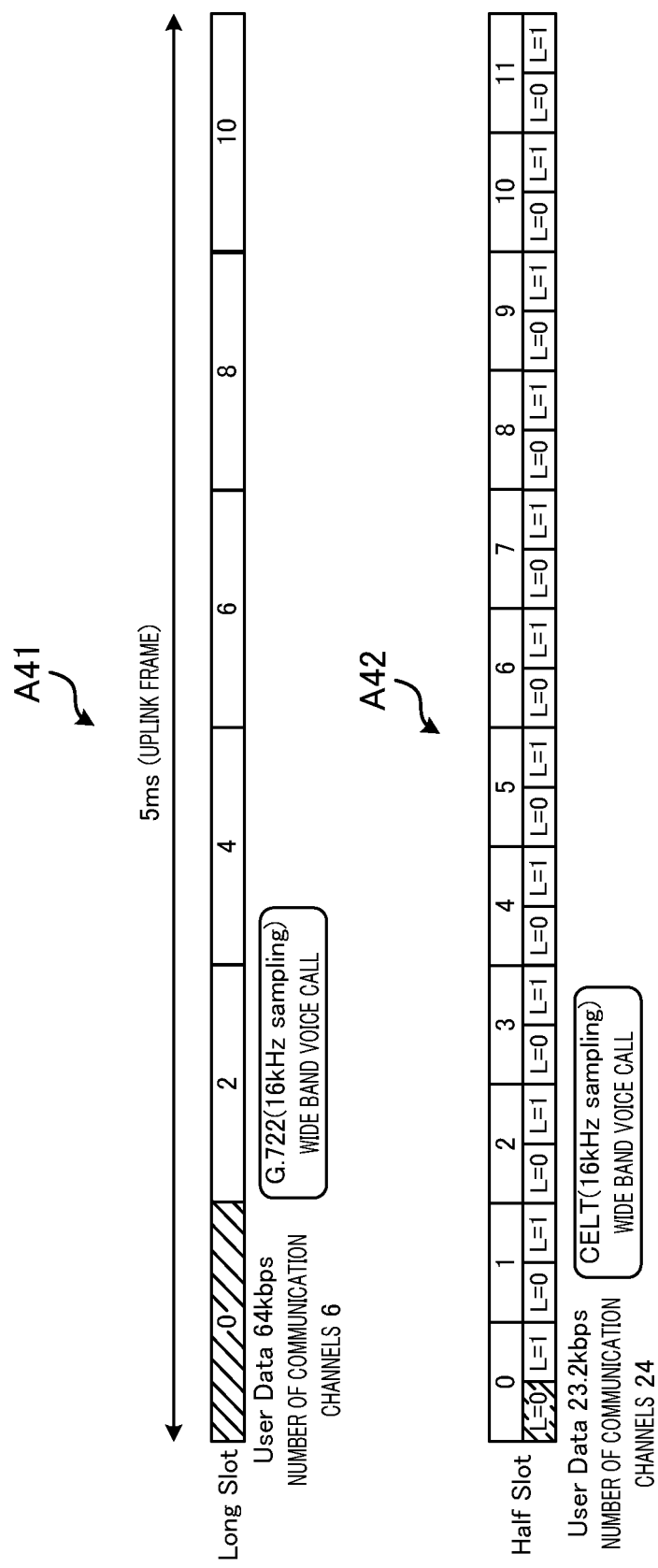
FIG. 11 illustrates an increase in the number of communication channels in a wide band voice call.

FIG. 11 illustrates an increase in the number of communication channels in wide band voice calls. Arrow A41 in FIG. 11 indicates an uplink frame configuration of a wide band voice call by the current DECT system. Arrow A42 in FIG. 11 indicates an uplink frame configuration of a wide band voice call of the present disclosure that conforms to the DECT system.

Voice data of a wide band voice call by the current DECT system (16 kHz sampling) is transmitted to the base unit in a long slot, as indicated by arrow A41 in FIG. 11. In the current DECT system, as voice data of a wide band voice call is transmitted to the base unit in a long slot, the number of communication channels is six.

In contrast, cordless telephone 1 of the present disclosure encodes (compresses) voice data sampled at 16 kHz, collected by microphone 15, by means of CELT. Then, in cordless telephone 1, voice data encoded by CELT is applied with QPSK modulation, and is stored in a half slot, as indicated by arrow A42 in FIG. 11. In cordless telephone 1, when voice data sampled at 16 kHz is encoded by CELT, it is encoded such that the voice data to be stored in the B-field (Original) of a half slot becomes 23.2 kbps. As cordless telephone 1 transmits voice data of a wide band voice call to base unit 2 in a half slot, the number of communication channels is twenty four.

In the above, description has been given on uplink. The same also applies to downlink. For example, base unit 2 encodes (compresses) voice data sampled at 16 kHz, output from interface 33, by means of CELT. Then, base unit 2 applies QPSK modulation to the voice data encoded by CELT, and stores it in a half slot. When encoding the voice data sampled at 16 kHz by CELT, base unit 2 encodes it such that the voice data to be stored in the B-field (Original) becomes 23.2 kbps. As base unit 2 transmits voice data of a wide band voice call to cordless telephone 1 in a half slot, the number of communication channels is twenty four.

Note that codec unit 21 of cordless telephone 1 encodes the voice data sampled at 16 kHz, collected by microphone 15, by means of CELT. Codec unit 21 encodes the voice data at a higher compression rate than that in the case of a narrow band voice call. At this time, to enhance the voice quality than that in a narrow band voice call, the codec unit 21 increases the complexity of the encoding process of the CELT (complexity) (increases the amount of computation). For example, codec unit 21 performs encoding with the setting of first complexity in the case of a narrow band voice call, while performs encoding with the setting of second complexity, that is larger than the first complexity, in the case of a wide band voice call. Modulator 22 applies QPSK modulation to control data, and to voice data encoded by CELT. Generator 23 stores a modulation signal of the control data applied with QPSK modulation in the 64-bit A-field (Original) of a half slot, and stores a modulation signal of the voice data applied with QPSK modulation in the 232-bit B-field (Original) of the half slot, to thereby generate a half slot. Radio unit 12 puts the generated half slot on the uplink frame, and transmits it to base unit 2 by radio.

Further, codec unit 41 of base unit 2 encodes voice data sampled at 8 kHz, to be output from interface 33, by means of CELT. Codec unit 41 encodes the voice data at a higher compression rate than that in the case of a narrow band voice call. Modulator 42 applies QPSK modulation to the control data, and to the voice data encoded by CELT. Generator 43 stores a modulation signal of the control data applied with QPSK modulation in the 64-bit A-field (Original) of a half slot, and stores a modulation signal of the voice data applied with QPSK modulation in the 232-bit B-field (Original) of the half slot, to thereby generate a half slot. Radio unit 32 puts the generated half slot on the downlink frame, and transmits it to cordless telephone 1 by radio.

Note that a narrow band voice call and a wide band voice call can be switched to each other by the setting of cordless telephone 1 and base unit 2.

Figure 12:
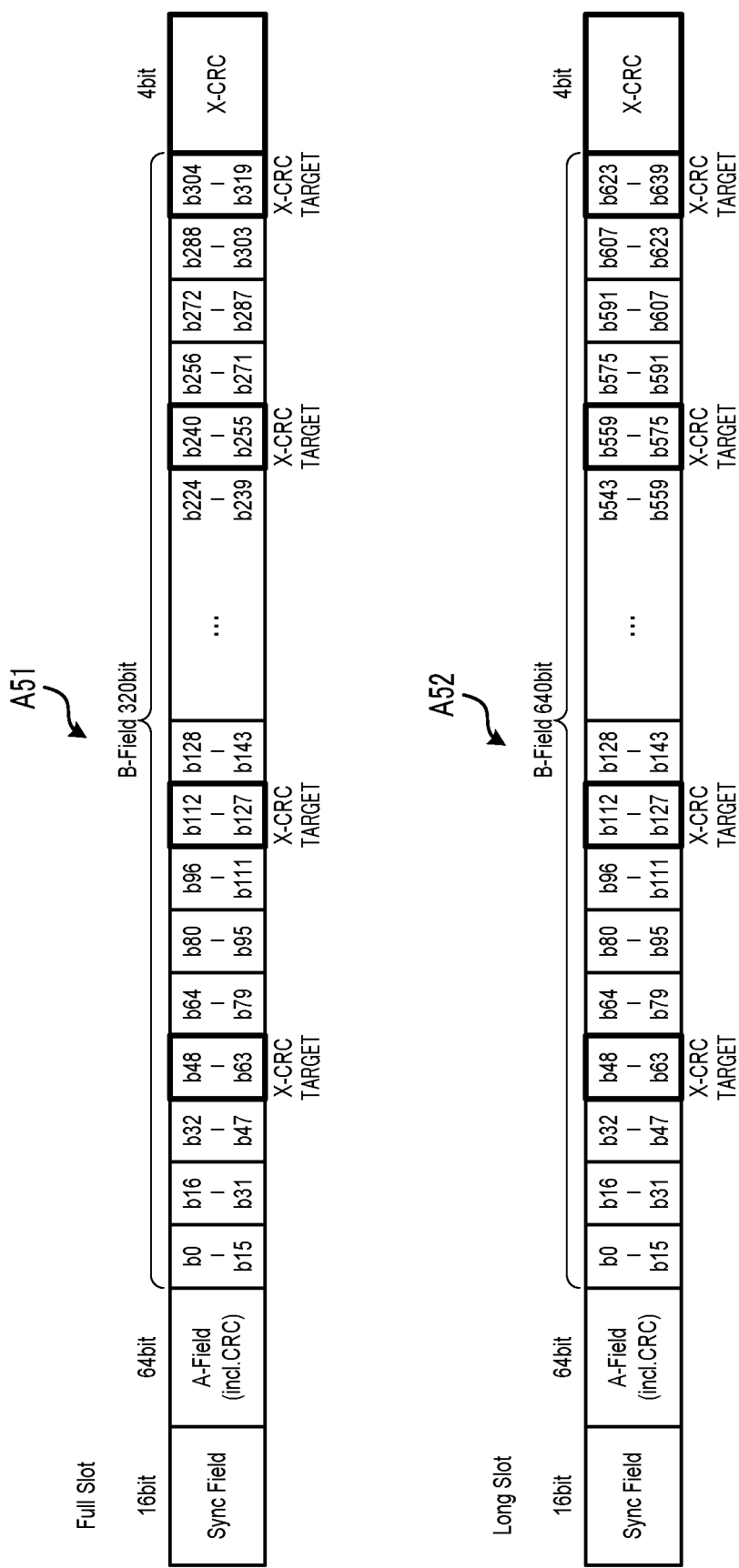
FIG. 12 illustrates error detection in the current DECT system.

FIG. 12 illustrates error detection in the current DECT system. Arrow A51 in FIG. 12 indicates a configuration of a part of a full slot. Arrow A52 in FIG. 12 indicates a configuration of a part of a long slot.

As indicated by arrows A51 and A52 in FIG. 12, an error in the B-field is detected by 4-bit X-CRC following the B-field. The current DECT system does not have error correction and retransmission processing. When an error is detected, it is processed such that unpleasant noise does not occur by muting, half-muting, filtering, Packet Loss Concealment (PLC) processing, and the like.

4-bit X-CRC does not monitor the entire bits of the B-field. As indicated by arrows A51 and A52 in FIG. 12, 4-bit X-CRC monitors inspection target bit strings of consecutive 16 bits (bold line portions in FIG. 12). Inspection target bit strings of consecutive 16 bits are uniformly arranged in the B-field.

It is found that in CELT, when an error occurs, a collapse of voice behaves differently from that in Adaptive Differential Pulse Code Modulation (ADPCM) used in the current DECT. For example, it is found that when an error occurs in the first half of the voice data compressed by CELT (CELT data), the voice is severely broken, but when an error occurs in the second half, less voice is broken. Therefore, in the cordless telephone system of the present disclosure, a part of the first half of the CELT data is subjected to detection of CRC errors.

Figure 13:
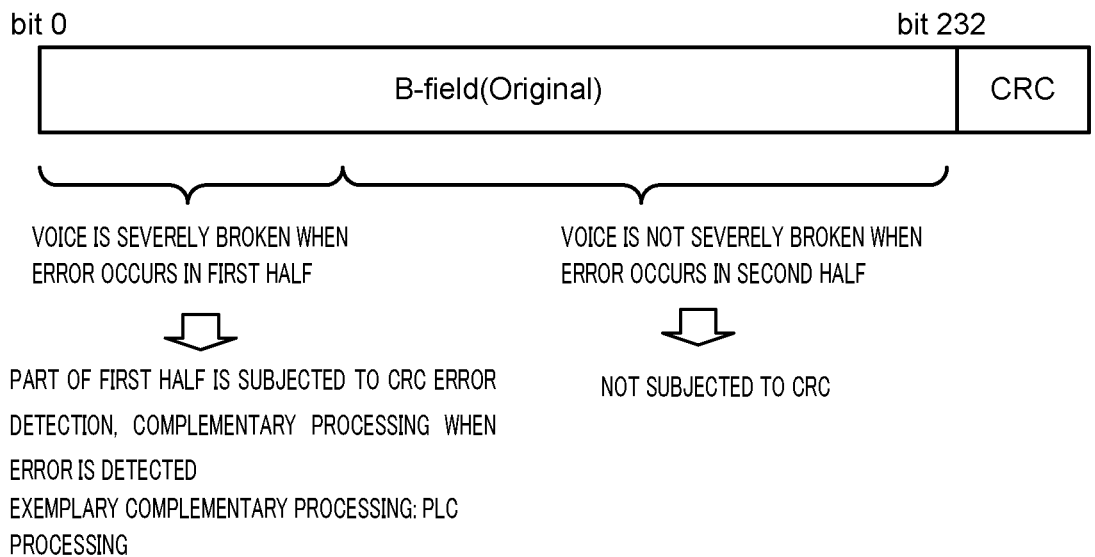
FIG. 13 illustrates error detection in the cordless telephone system of the present disclosure.

FIG. 13 illustrates error detection in the cordless telephone system of the present disclosure. As illustrated in FIG. 13, an error in the CELT data of B-field (Original) is detected by the CRC following the B-field (Original).

CRC does not monitor the entire bits of the B-field (Original). CRC monitors a part of the first half of the B-field (Original). Specifically, the target of error detection by the CRC is a consecutive partial data including the head of CELT data. Note that CRC can be calculated by inputting the number of bits of the CRC target CELT data to the CRC calculation function, for example.

In the cordless telephone system of the present disclosure, when there is an error in the CELT data, PLC processing is performed. Also, when errors in the CELT data occur in succession, PLC processing is switched to muting of voice data. Note that when the PLC processing is performed continuously, the voice becomes robot voice. Therefore, when errors in the CELT data occur in succession, PLC processing is switched to muting of voice data.

Figure 14:
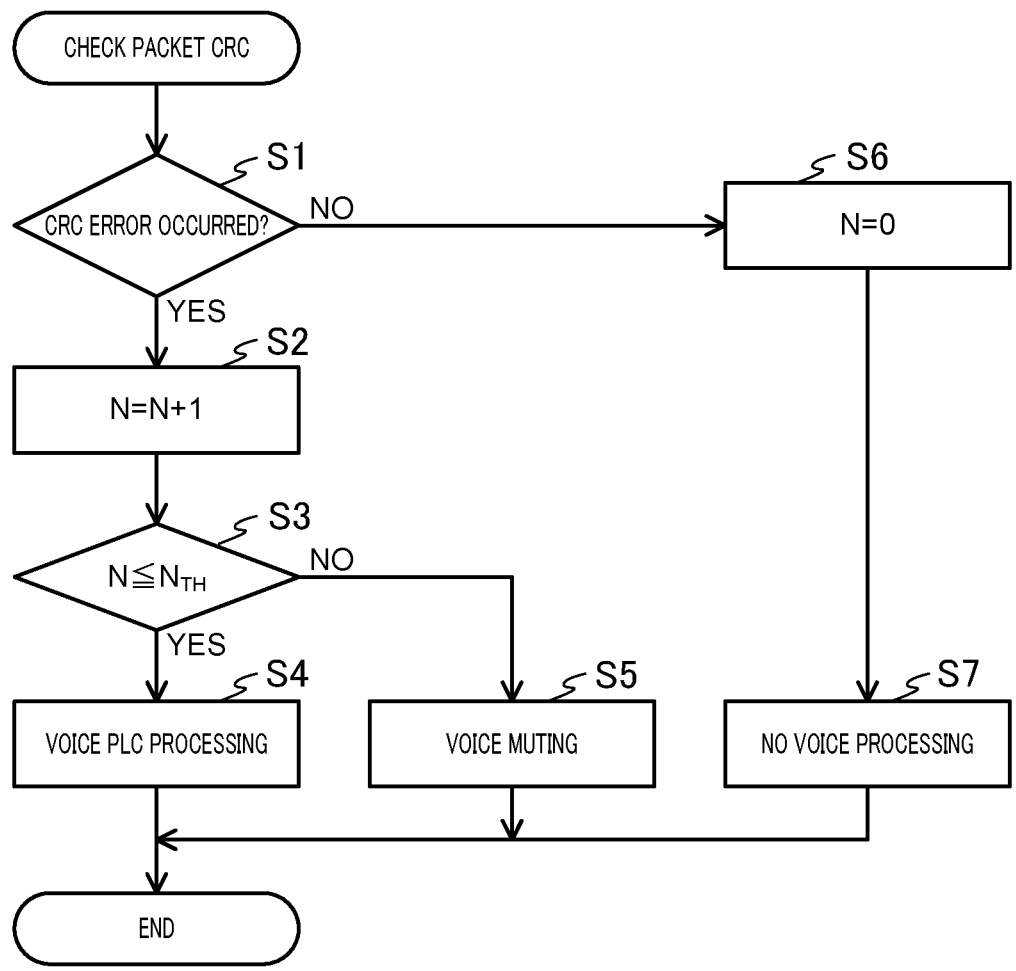
FIG. 14 is a flowchart showing an example of voice processing of a cordless telephone.

FIG. 14 is a flowchart illustrating an example of voice processing in cordless telephone 1. Cordless telephone 1 executes the processing of the flowchart of FIG. 14 each time it receives CELT data of the B-field (Original) of the DL frame.

Cordless telephone 1 determines whether or not a CRC error has occurred in the CELT data of DL (step S1).

When cordless telephone 1 determines that a CRC error has occurred in the CELT data of DL ("YES" at S1), cordless telephone 1 adds 1 to a variable N (step S2).

After adding 1 to the variable N, cordless telephone 1 determines whether or not the variable N is equal to or smaller than a threshold $N_{TH}$ (step S3).

When determining that the variable N is equal to or smaller than the threshold $N_{TH}$ ("YES" at S3), cordless telephone 1 performs PLC processing on the CELT data (step S4). Then, cordless telephone 1 ends the processing of this flowchart.

Meanwhile, when determining that the variable N is not equal to or smaller than the threshold $N_{TH}$ ("NO" at S3), cordless telephone 1 performs voice muting (step S5). Then, cordless telephone 1 ends the processing of this flowchart.

That is, when the number of continuous occurrences of CRC errors exceeds $N_{TH}$ times, cordless telephone 1 performs voice muting.

When cordless telephone 1 determines that there is no CRC error in the CELT data of DL ("NO" at S1), cordless telephone 1 sets the variable N to 0 (step S6). Cordless telephone 1 does not perform voice processing (step S7), and ends the processing of the flowchart.

Note that error detector 25 of cordless telephone 1 performs the error detection processing and the voice processing described above. Further, while description has been given above on the processing of cordless telephone 1, the same also applies to base unit 2. Error detector 45 of base unit 2 performs the error detection processing and the voice processing described above.

Figure 15:
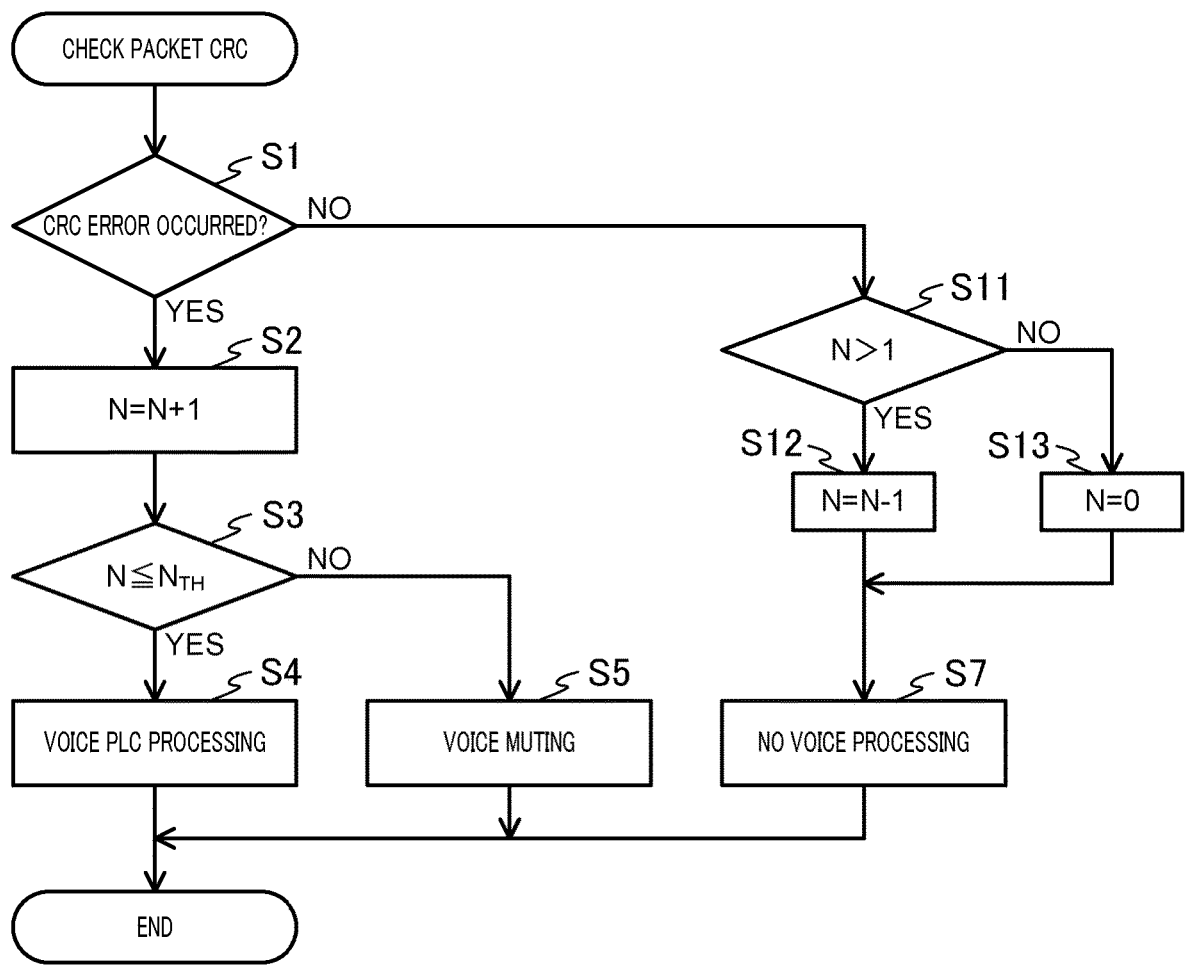
FIG. 15 is a flowchart showing another example of voice processing of a cordless telephone.

FIG. 15 is a flowchart illustrating another example of voice processing performed by cordless telephone 1. In FIG. 15, the same processing as that of FIG. 14 is denoted by the reference numeral of the same step. Hereinafter, description will be given on the processing different from that of FIG. 14.

In the processing of FIG. 14, when a CRC error does not occur, the variable N is set to 0 (see step S6 of FIG. 14). In contrast, in the processing of FIG. 15, when a CRC error does not occur, the variable N is changed by subtracting 1 each time. That is, in the processing of FIG. 15, when a CRC error no longer occurs after the continuous occurrences of CRC errors, the variable N is not immediately set to 0 but is gradually changed to 0. Thus, when a CRC error occurs again, cordless telephone 1 can easily switch the processing to muting.

When cordless telephone 1 determines that there is no CRC error in the CELT data of DL in the processing of step S1 ("NO" at S1), cordless telephone 1 determines whether or not the variable N is larger than 1 (step S11).

When determining that the variable N is larger than 1 ("YES" at S11), cordless telephone 1 subtracts 1 from the variable N (step S12).

In contrast, when determining that the variable N is not larger than 1 ("NO" at S11), cordless telephone 1 sets the variable N to 0 (step S13).

Note that error detector 25 of cordless telephone 1 performs the error detection processing and the voice processing described above. While description has been given above on the processing of cordless telephone 1, the same also applies to base unit 2. Error detector 45 of base unit 2 performs the error detection processing and the voice processing described above.

As described above, cordless telephone 1 that establishes a call with a destination telephone via base unit 2 includes controller 11 and radio unit 12. Controller 11 applies QPSK modulation to control data for controlling radio communication and voice data to be transmitted to the telephone, and stores a multi-level modulation control signal of the control data and a multi-level modulation control signal of the voice data, to which QPSK modulation is applied, in a half slot of the DECT system. Controller 11 stores the multi-level modulation control signal in a part of the A-field of the half slot, and stores the multi-level modulation voice signal to the B-field of the half slot and in the remaining part of the A-field. Radio unit 12 transmits, by radio, the generated half slot to base unit 2. Thereby, cordless telephone 1 can increase the number of communication channels, while suppressing deterioration of voice quality.

Base unit 2 that performs radio communication with cordless telephone 1 includes controller 31 and radio unit 32. Controller 31 applies QPSK modulation to control data for controlling radio communication and voice data to be transmitted to cordless telephone 1, and stores a multi-level modulation control signal of the control data and a multi-level modulation control signal of the voice data, to which QPSK modulation is applied, in a half slot of the DECT system. Controller 31 stores the multi-level modulation control signal in a part of the A-field of the half slot, stores the multi-level modulation voice signal to the B-field of the half slot and in the remaining part of the A-field. Radio unit 32 transmits, by radio, the generated half slot to cordless telephone 1. Thereby, cordless telephone 1 can increase the number of communication channels, while suppressing deterioration of voice quality.

As described regarding the half slot of arrow A23 of FIG. 9, controller 11 of cordless telephone 1 stores modulated voice data in 64 bits of the second half of the A-filed, but the present embodiment is not limited thereto. For example, as indicated by the half slot of arrow A22 of FIG. 9, controller 11 may store voice data only in the 160-bit B-field of the half slot. Then, controller 11 may store control data in the 128-bit A-field. In that case, controller 11 performs encoding by CELT such that the modulated voice data becomes 160 kbps. Similarly, as indicated by the half slot of arrow A22 of FIG. 9, controller 31 of base unit 2 may store voice data only in the 160-bit B-field.

Further, as described regarding the half slot of arrow A23 in FIG. 9, while an area of a Z-field is used as the B-field, the present embodiment is not limited thereto. For example, a half slot of arrow A23 in FIG. 9 may have areas of an X-Field and the Z-Field. In that case, the B-field shown in the half slot of arrow A23 in FIG. 9 has 224 bits.

Further, when the half slot of arrow A23 in FIG. 9 has X-Field and Z-Field areas, for example, the number of bits of each of the X-Field and the Z-Field may be 4 bits. Even in that case, B-field has 232 bits.

Further, the number of bits of the X-Field in the half slot of arrow A23 of FIG. 9 may be 4 bits. In that case, the B-field has 236 bits.

In the cordless telephone system of the present disclosure, the number of communication channels of wide band voice calls and narrow band voice calls is twenty four (the maximum number of simultaneous calls is twenty four). However, the number of simultaneous calls in the case of wide band voice calls may be eight, and the number of simultaneous calls in the case of narrow band voice call may be sixteen. This can suppress the amount of processing of the chips in wide band voice calls and narrow band voice calls.

Further, in the CELT, it is possible to improve the voice quality by increasing the processing complexity. However, when the number of simultaneous calls in the narrow band voice calls is larger than the number of simultaneous calls of the wide band voice calls, the complexity in the narrow band voice call may be smaller than the complexity of the wide band voice call. When the number of simultaneous calls in the narrow band voice calls is larger than the number of simultaneous calls of the wide band voice calls, the throughput of the chip in the narrow band voice call is increased. However, by reducing the complexity of the narrow band voice call, the throughput of the chip can be suppressed.

Further, cordless telephone 1 may be configured such that registration to base unit 2 can be made by the same registration method as that of the old-type base unit (current base unit). In cordless telephone 1, the firmware update method may be the same as that of the old-type cordless telephone. Thereby, cordless telephone 1 can also register to the old-type base unit. Further, cordless telephone 1 may rewrite the software using firmware update, and change the function from that compatible to a half slot to that compatible to a full slot and a long slot (current DECT-compatible function).

Further, while CELT is used as codec of voice data in the above description, the present embodiment is not limited thereto. Voice data may be applied with another codec system. Other codec systems include, as codec of higher compression than that of DECT standard ADPCM, Adaptive Multi-Rate (AMR), Adaptive Multi-Rate Wideband (AMR-WB), Low Complexity Communication Codec (LC3), OPUS, Enhanced Voice Services (EVS), and the like.

Further, in the above description, cordless telephone 1 applies QPSK modulation to control data and voice data, and stores them in the half slot indicated by arrow A23 in FIG. 9, but the present embodiment is not limited thereto. Cordless telephone 1 may apply binary modulation (for example, 2FSK modulation) to control data and voice data, and store them in the half slot indicated by arrow A13 in FIG. 8. Thereby, cordless telephone 1 can increase the number of communication channels. In that case, cordless telephone 1 may encode voice data by CELT, and applies binary modulation. Thereby, cordless telephone 1 can suppress degradation of voice quality. The same also applies to base unit 2. Similarly, control data and voice data may be applied with 8-level modulation (for example, 8PSK modulation).

Embodiment 2

In Embodiment 2, a cordless telephone system including a repeater will be described. Hereinafter, description will be given on the part different from Embodiment 1.

Figure 16:
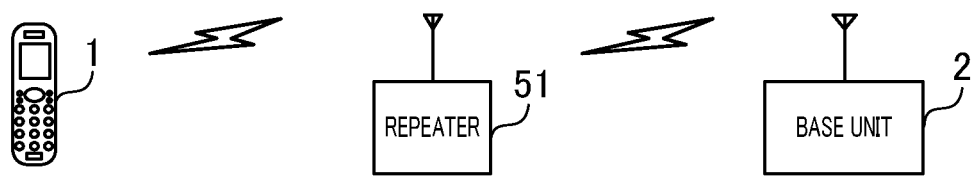
FIG. 16 illustrates an exemplary configuration of a cordless telephone system according to Embodiment 2 of the present disclosure.

FIG. 16 illustrates an exemplary configuration of a cordless telephone system according to Embodiment 2 of the present disclosure. In FIG. 16, the same parts as those of FIG. 1 are denoted by the same reference numerals. The cordless telephone system includes repeater 51. Cordless telephone 1 and base unit 2 perform radio communication via repeater 51.

Although FIG. 16 illustrates only one cordless telephone 1, a plurality of cordless telephones may be used. A plurality of cordless telephones 1 are able to establish simultaneous calls. For example, in the cordless telephone system illustrated in FIG. 16, it is possible to establish simultaneous calls by twelve cordless telephones at maximum in either the case of narrow band voice call or the case of wide band voice call. This will be described in detail below. In other words, the number of communication channels of the cordless telephone system illustrated in FIG. 16 has twelve channels in either the case of narrow band voice call or the case of wide band voice call.

Figure 17:
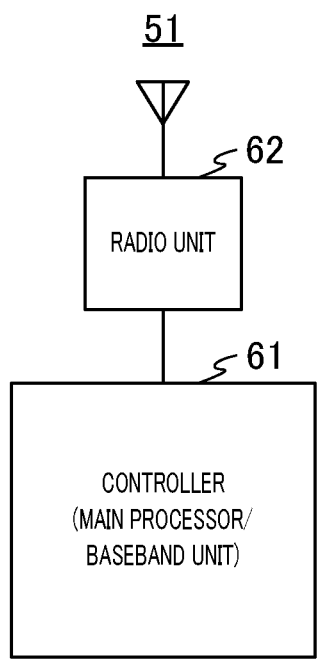
FIG. 17 illustrates an exemplary block configuration of a repeater.

FIG. 17 illustrates an exemplary block configuration of repeater 51. As illustrated in FIG. 17, repeater 51 includes controller 61 and radio unit 62.

Controller 61 controls the entire repeater 51. Controller 61 also performs baseband processing. Controller 61 may be configured of either one of or both of a CPU and a DSP, for example. Controller 61 may also be referred to as a main processor/baseband unit.

Radio unit 62 receives a UL signal transmitted from cordless telephone 1 via an antenna. Radio unit 62 performs reception processing such as amplification and down-conversion, on the received UL signal. Radio unit 62 outputs the UL signal, on which reception processing is performed, to controller 61.

To radio unit 62, a UL signal (signal to be transmitted to base unit 2) output from controller 61 is input. Radio unit 62 performs transmission processing such as amplification and up-conversion, on the input UL signal. Radio unit 62 transmits the UL signal, on which transmission processing is performed, to base unit 2 via an antenna.

Radio unit 62 receives a DL signal transmitted from base unit 2 via an antenna. Radio unit 62 performs reception processing such as amplification and down-conversion, on the received DL signal. Radio unit 62 outputs the DL signal, on which reception processing is performed, to controller 61.

To radio unit 62, a DL signal (signal to be transmitted to cordless telephone 1) output from controller 61 is input. Radio unit 62 performs transmission processing such as amplification and up-conversion, on the input DL signal. Radio unit 62 transmits the DL signal, on which transmission processing is performed, to cordless telephone 1 via an antenna.

Figure 18:
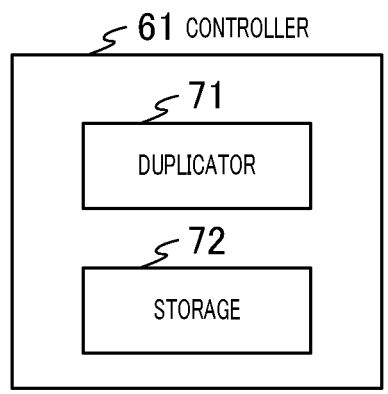
FIG. 18 illustrates an exemplary block configuration of a controller of a repeater.

FIG. 18 illustrates an exemplary block configuration of controller 61 of repeater 51. As illustrated in FIG. 18, controller 61 of repeater 51 includes duplicator 71 and storage 72.

Duplicator 71 duplicates the data stored in a half slot of the uplink, received from cordless telephone 1, to the next half slot of the uplink. Duplicator 71 outputs the next half slot in which the data is duplicated, to radio unit 62.

Further, duplicator 71 duplicates the data stored in a half slot of the downlink, received from base unit 2, to the next half slot of the downlink. Duplicator 71 outputs the next half slot in which the data is duplicated, to radio unit 62.

In storage 72, a program for operation of controller 61 is stored, for example. In storage 72, data for performing calculation processing or data for controlling respective units of repeater 51, by controller 61, are also stored. Storage 72 may reside outside controller 61.

Figure 19:
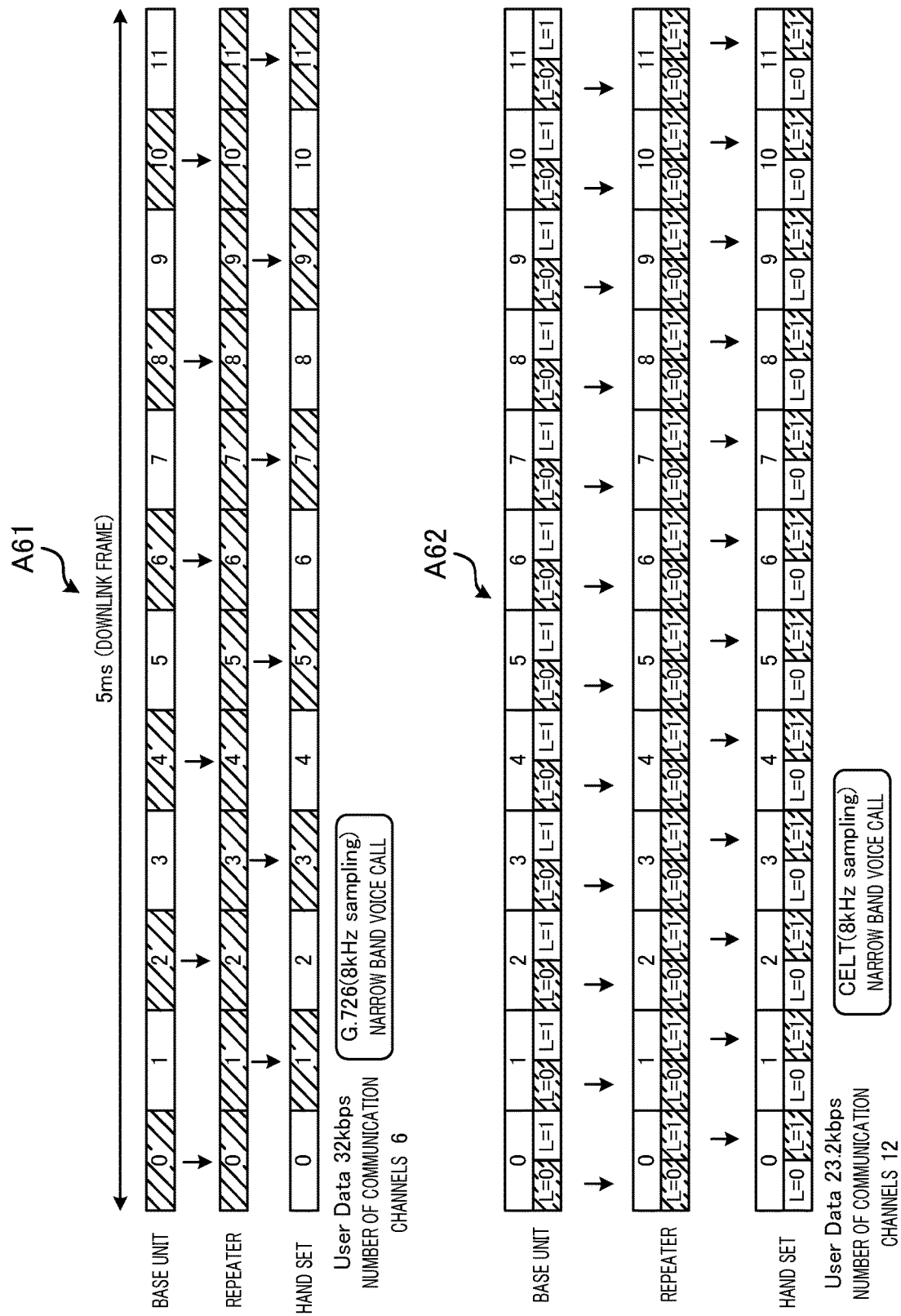
FIG. 19 illustrates an increase in the number of communication channels in a narrow band voice call.

FIG. 19 illustrates an increase in the number of communication channels of narrow band voice calls. Arrow A61 in FIG. 19 indicates a downlink frame configuration of a narrow band voice call by the current DECT system. Arrow A62 in FIG. 19 indicates a downlink frame configuration of a narrow band voice call of the present disclosure conforming to the DECT system.

Voice data of a narrow band voice call (8 kHz sampling) by the current DECT system is transmitted from a base unit to a cordless telephone via a repeater in a full slot, as indicated by arrow A61 in FIG. 19. When a repeater is interposed between the cordless telephone and the base unit, the base unit transmits the voice data to the repeater with one slot left, as indicated by arrow A61 in FIG. 19.

The repeater duplicates the voice data, received from the base unit, to the next slot and transmits it to the cordless telephone. For example, the repeater duplicates the voice data, received in the slot 0, to the slot 1, and transmits it to the cordless telephone. In the current DECT system, as voice data of a narrow band voice call is communicated in a full slot, the number of communication channels is six.

Meanwhile, voice data in a narrow band voice call (8 kHz sampling) of the present disclosure conforming to DECT system is transmitted from base unit 2 to cordless telephone 1 in a half slot, as indicated by arrow A62 in FIG. 19. When repeater 51 is interposed between base unit 2 and cordless telephone 1, base unit 2 transmits voice data to repeater 51 with one slot left, as indicated by arrow A62 in FIG. 19.

Repeater 51 duplicates the voice data, received from base unit 2, to the next half slot, and transmits it to cordless telephone 1. For example, repeater 51 duplicates the voice data, received in the half slot of L=0, to the next (adjacent) half slot of L=1, and transmits it to cordless telephone 1. In the cordless telephone system of the present disclosure conforming to the DECT system, as the voice data of a narrowband voice call is communicated in a half slot, the number of communication channels is twelve.

In the above, description has been given on downlink. The same also applies to uplink. For example, repeater 51 receives voice data transmitted from cordless telephone 1. Repeater 51 stores the received voice data in the next half slot, and transmits it to base unit 2.

Note that duplicator 71 duplicates the control data and the voice data, transmitted from base unit 2, to the next half slot. For example, the control data transmitted from base unit 2 is stored in the A-field (Original) of L=0 of the half slot, and the voice data is stored in the B-field (Original) of L=0 of the half slot. Duplicator 71 stores (duplicates) the control data and the voice data to the A-field (Original) of L=1 of the next half slot and to the B-field (Original) of L=1 of the half slot. Radio unit 62 puts the half slot of L=1, in which the data is stored, on a downlink frame, and transmits it to cordless telephone 1 by radio.

Further, duplicator 71 duplicates the control data and the voice data, transmitted from cordless telephone 1, to the next half slot. For example, the control data transmitted from cordless telephone 1 is stored in the A-field (Original) of L=0 of the half slot, and the voice data is stored in the B-field (Original) of L=0 of the half slot. Duplicator 71 stores (duplicates) the control data and the voice data to the A-field (Original) of L=1 of the next half slot and to the B-field (Original) of L=1 of the half slot. Radio unit 62 places the L=1 half slot in which the data is stored on the uplink frame, and transmits it to base unit 2 by radio.

Further, in the above description, repeater 51 duplicates the voice data, received in the half slot of L=0, to the next (adjacent) half slot of L=1, and transmits it to cordless telephone 1. However, the present embodiment is not limited thereto. For example, repeater 51 may transmit the voice data, received in the half slot of L=0, to cordless telephone 1 by using any of the subsequent half slots.

Figure 20:
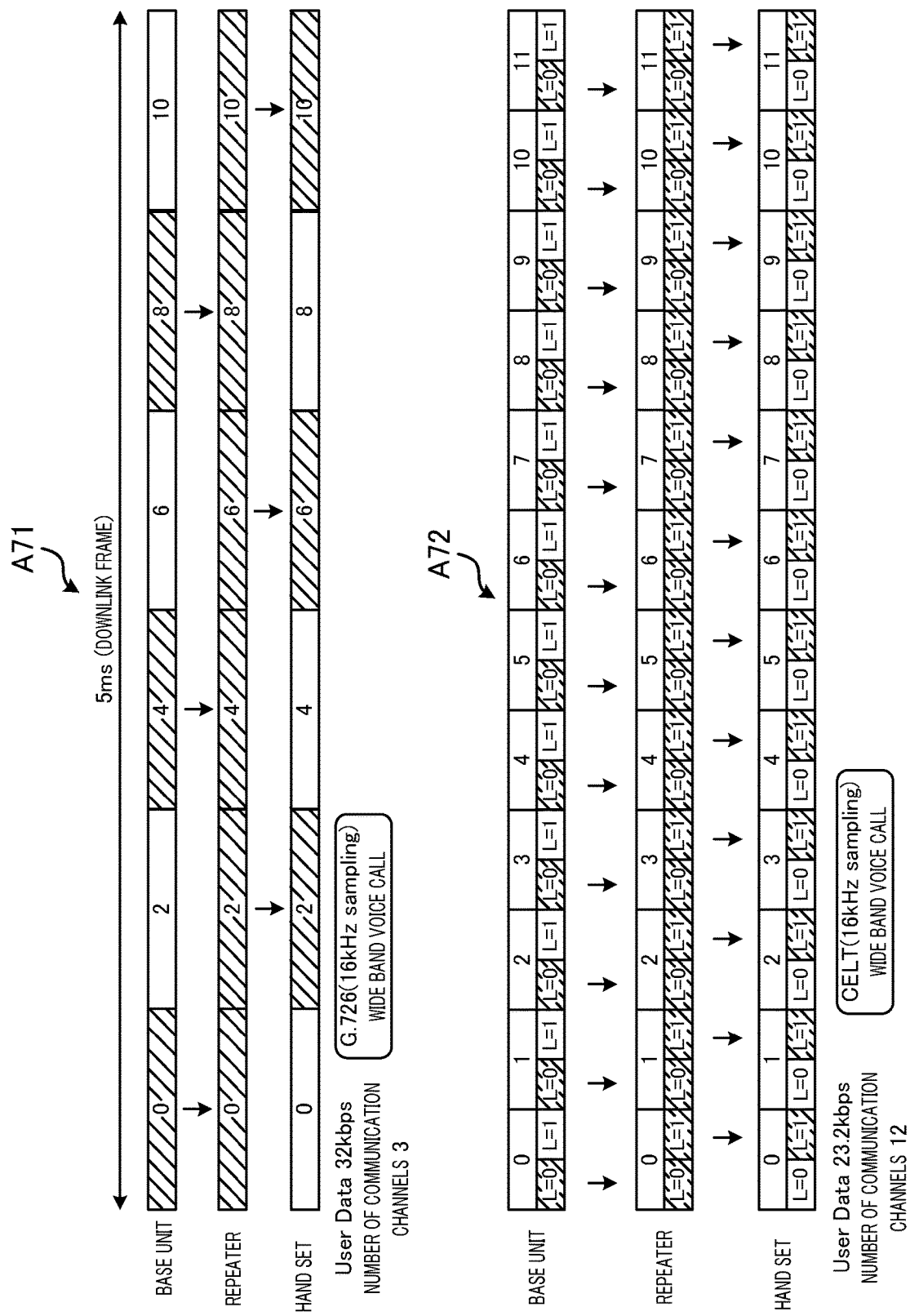
FIG. 20 illustrates an increase in the number of communication channels in a wide band voice call.

FIG. 20 illustrates an increase in the number of communication channels in wide band voice calls. Arrow A71 in FIG. 20 indicates a downlink frame configuration of a wide band voice call by the current DECT system. Arrow A72 in FIG. 20 indicates a downlink frame configuration of a wide band voice call of the present disclosure conforming to the DECT system.

Voice data in a narrow band voice call (16 kHz sampling) by the current DECT system is transmitted from a base unit to a cordless telephone via a repeater in a long slot, as indicated by arrow A71 in FIG. 20. When a repeater is interposed between the cordless telephone and the base unit, the base unit transmits the voice data to the repeater with one slot left, as indicated by arrow A71 in FIG. 20.

The repeater duplicates the voice data, received from the base unit, to the next slot and transmits it to the cordless telephone. For example, the repeater stores the voice data, received in the slot 0, in the slot 1, and transmits it to the cordless telephone. In the current DECT system, voice data of a narrow band voice call is communicated in a long slot. Therefore, the number of communication channels is three.

Meanwhile, voice data in a wide band voice call (16 kHz sampling) of the present disclosure conforming to the DECT system is transmitted from base unit 2 to cordless telephone 1 in a half slot, as indicated by arrow A72 in FIG. 20. When repeater 51 is interposed between base unit 2 and cordless telephone 1, base unit 2 transmits voice data to repeater 51 with one slot left, as indicated by arrow A72 in FIG. 20.

Repeater 51 duplicates the voice data, received from base unit 2, to the next half slot, and transmits it to cordless telephone 1. For example, repeater 51 duplicates the voice data, received in the half slot of L=0, to the next (adjacent) half slot of L=1, and transmits it to cordless telephone 1. In the cordless telephone system of the present disclosure conforming to the DECT system, as the voice data of a wide band voice call is communicated in a half slot, the number of communication channels is twelve.

In the above description, description has been given on downlink. The same also applies to uplink. For example, repeater 51 receives voice data transmitted from cordless telephone 1. Repeater 51 stores the received voice data in the next half slot, and transmits it to base unit 2.

Note that duplicator 71 duplicates the control data and the voice data, transmitted from base unit 2, to the next half slot. For example, the control data transmitted from base unit 2 is stored in the A-field (Original) of L=0 of the half slot, and the voice data is stored in the B-field (Original) of L=0 of the half slot. Duplicator 71 stores (duplicates) the control data and the voice data to the A-field (Original) of L=1 of the next half slot and to the B-field (Original) of L=1 of the half slot. Radio unit 62 puts the half slot of L=1, in which the data is stored, on a downlink frame, and transmits it to cordless telephone 1 by radio.

Further, duplicator 71 duplicates the control data and the voice data, transmitted from cordless telephone 1, to the next half slot. For example, the control data transmitted from cordless telephone 1 is stored in the A-field (Original) of L=0 of the half slot, and the voice data is stored in the B-field (Original) of L=0 of the half slot. Duplicator 71 stores (duplicates) the control data and the voice data in the A-field (Original) of L=1 of the next half slot and in the B-field (Original) of L=1 of the half slot. Radio unit 62 places L=1 of the half slot in which the data is stored on the uplink frame, and transmits it to base unit 2 by radio.

Further, in the above description, repeater 51 duplicates the voice data, received in the half slot of L=0, to the next (adjacent) half slot of L=1, and transmits it to cordless telephone 1. However, the present embodiment is not limited thereto. For example, repeater 51 may transmit the voice data, received in the half slot of L=0, to cordless telephone 1 by using any of the subsequent half slots.

As described above, repeater 51 that relays radio communication between cordless telephone 1 and base unit 2 by using a half slot of the DECT system includes controller 61 and radio unit 62. Controller 61 duplicates the control data and the voice data stored in a half slot of the uplink received from cordless telephone 1 to the next half slot of the uplink, and duplicates the control data and the voice data stored in a half slot of the downlink received from base unit 2 to the next half slot of the downlink. Control unit 61 stores the control data of cordless telephone 1 in a part of the A-filed of the next half slot of the uplink, and stores the voice data of cordless telephone 1 in the B-file of the next half slot of the uplink and also in the remaining part of the A-filed. Control unit 61 also stores the control data of base unit 2 in a part of the A-filed of the next half slot of the downlink, and stores the voice data of base unit 2 in the B-file of the next half slot of the downlink and also in the remaining part of the A-filed. Radio unit 62 transmits, by radio, the next half slot of the uplink to base unit 2, and transmits, by radio, the next half slot of the downlink to cordless telephone 1. Thereby, repeater 51 can increase the number of communication channels, while suppressing deterioration of voice quality.

Each of the functional blocks employed in the description of the embodiment described above is typically implemented as an LSI that is an integrated circuit. They may be implemented individually as single chips, or may be integrated in one chip containing part or all. While it is referred to as an LSI in this example, it may also be referred to as an IC, a system LSI, a super LSI, or an ultra LSI, depending on the degree of integration.

Further, the method of circuit integration is not limited to LSI, and may be realized by a dedicated circuit or a general-purpose processor. It is possible to use a Field Programmable Gate Array (FPGA) that can be programmed after the manufacturing of an LSI, or to use a reconfigurable processor in which connections and settings of circuit cells disposed inside the LSI can be reconfigured.

Further, if future integrated circuit technology replaces LSIs as a result of advancement of semiconductor technology or other derivative technology, the functional blocks may be integrated using such technology. Biotechnology can also be applied.

INDUSTRIAL APPLICABILITY

The present disclosure is applicable to a cordless telephone system installed in an office or a home.

REFERENCE SIGNS LIST 1 cordless phone
2 base unit
11, 31, 61 controller
12, 32, 62 radio unit
13 audio unit
14 speaker
15 microphone
21, 41 codec unit
22, 42 modulator
23, 43 generator
24, 44 demodulator
25, 45 error detector
26, 46, 72 storage
33 interface
51 repeater
71 duplicator The ivention claimed is:

1. A cordless telephone that establishes a call with a telephone of a destination via a base unit, the cordless telephone comprising:
   a controller that modulates control data for controlling radio communication and voice data to be transmitted to the telephone, and stores a modulation control signal of the control data and a modulation voice signal of the voice data in a half slot of a Digital Enhanced Cordless Telecommunications (DECT) system; and
   a radio unit that transmits, by radio, the half slot to the base unit.

2. The cordless telephone according to claim 1, wherein the controller applies Quadrature Phase Shift Keying (QPSK) modulation to the control data and the voice data.

3. The cordless telephone according to claim 1, wherein the controller encodes the voice data by an encoding method of higher compression than compression of an Adaptive Differential Pulse Code Modulation (ADPCM) encoding method.

4. The cordless telephone according to claim 1, wherein the controller encodes the voice data by a Constrained Energy Lapped Transform (CELT) encoding method.

5. The cordless telephone according to claim 1, wherein the controller stores the modulation control signal in a part of an A-filed of the half slot, and stores the modulation voice signal in a B-filed of the half slot and also in a remaining part of the A-filed.

6. The cordless telephone according to claim 4, wherein
when the controller transmits the voice data to the telephone with first voice quality, the controller samples the voice data at a first sampling rate, and encodes the voice data at a first compression rate with a setting of first complexity, and
when the controller transmits the voice data to the telephone with second voice quality that is higher than the first voice quality, the controller samples the voice data at a second sampling rate that is higher than the first sampling rate, and encodes the voice data at a second compression rate that is higher than the first compression rate with a setting of second complexity that is larger than the first complexity.

7. The cordless telephone according to claim 1, wherein the radio unit receives, from the base unit, destination voice data of the telephone, the destination voice data being encoded by an encoding method of higher compression than compression of the ADPCM encoding method and modulated in the base unit and being stored in the half slot, and
the controller detects an error in a part of consecutive data including a head of the destination voice data stored in the half slot or in one or more parts of the data.

8. The cordless telephone according to claim 7, wherein the controller encodes the voice data by the CELT encoding method.

9. The cordless telephone according to claim 7, wherein, when the controller detects an error in the destination voice data, the controller performs Packet Loss Concealment (PLC) processing on the destination voice data, and when the controller continuously detects errors in the destination voice data a predetermined number of times, the controller performs muting on the destination voice data.

10. A base unit that performs radio communication with a cordless telephone, the base unit comprising:
a controller that modulates control data for controlling the radio communication and voice data to be transmitted to the cordless telephone, and stores a modulation control signal of the control data and a modulation voice signal of the voice data in a half slot of a DECT system; and
a radio unit that transmits, by radio, the half slot to the cordless telephone.

11. The base unit according to claim 10, wherein the controller applies QPSK modulation to the control data and the voice data.

12. The base unit according to claim 10, wherein the controller encodes the voice data by an encoding method of higher compression than compression of an ADPCM encoding method.

13. The base unit according to claim 10, wherein the controller encodes the voice data by a CELT encoding method.

14. The base unit according to claim 10, wherein the controller stores the modulation control signal in a part of an A-filed of the half slot, and stores the modulation voice signal in a B-filed of the half slot and also in a remaining part of the A-filed.

15. The base unit according to claim 13, wherein
when the controller transmits the voice data to the telephone with first voice quality, the controller samples the voice data at a first sampling rate, and encodes the voice data at a first compression rate with a setting of first complexity, and
when the controller transmits the voice data to the telephone with second voice quality that is higher than the first voice quality, the controller samples the voice data at a second sampling rate that is higher than the first sampling rate, and encodes the voice data at a second compression rate that is higher than the first compression rate with a setting of second complexity that is larger than the first complexity.

16. The base unit according to claim 14, wherein
when the controller transmits the voice data to the telephone with first voice quality, the controller samples the voice data at a first sampling rate, and encodes the voice data at a first compression rate with a setting of first complexity, and
when the controller transmits the voice data to the telephone with second voice quality that is higher than the first voice quality, the controller samples the voice data at a second sampling rate that is higher than the first sampling rate, and encodes the voice data at a second compression rate that is higher than the first compression rate with a setting of second complexity that is larger than the first complexity.

17. The base unit according to claim 10, wherein
the radio unit receives, from the cordless telephone, origin voice data of the cordless telephone, the origin voice data being encoded by an encoding method of higher compression than compression of an ADPCM encoding method and modulated in the cordless telephone and being stored in the half slot, and
the controller detects an error in a part of consecutive data including a head of the origin voice data stored in the half slot, or in one or more parts of the data.

18. The base unit according to claim 17, wherein, when the controller detects an error in the origin voice data, the controller performs PLC processing on the origin voice data, and when the controller continuously detects errors in the origin voice data a predetermined number of times, the controller performs muting on the origin voice data.

* * * * *